United States Patent [19]

Engström et al.

[11] Patent Number: 4,755,134

[45] Date of Patent: Jul. 5, 1988

[54] CIRCULATING FLUIDIZED BED REACTOR

[75] Inventors: Folke Engström, San Diego; Ragnar G. Lundqvist, La Jolla, both of Calif.

[73] Assignee: A. Ahlstrom Corporation, Karhula, Finland

[21] Appl. No.: 52,047

[22] PCT Filed: Aug. 25, 1986

[86] PCT No.: PCT/FI86/00091

§ 371 Date: May 8, 1987

§ 102(e) Date: May 8, 1987

[87] PCT Pub. No.: WO87/01791

PCT Pub. Date: Mar. 26, 1987

[30] Foreign Application Priority Data

Sep. 11, 1985 [FI] Finland .................................. 853464

[51] Int. Cl.[4] .............................................. F23D 19/00
[52] U.S. Cl. .................................... 431/170; 122/4 D; 110/245
[58] Field of Search ............................. 110/243–245; 122/4 D; 431/170, 7; 432/15, 58

[56] References Cited

U.S. PATENT DOCUMENTS 4,419,966  12/1983  Jenkins et al. ...................... 122/4 D

FOREIGN PATENT DOCUMENTS

| 115328 | 11/1900 | Fed. Rep. of Germany . |
| 598423 | 6/1934 | Fed. Rep. of Germany . |
| 1767699 | 9/1971 | Fed. Rep. of Germany . |
| 86/04402 | 7/1966 | PCT Int'l Appl. . |
| 86/04403 | 7/1986 | PCT Int'l Appl. . |
| 2104408A | 3/1983 | United Kingdom . |
| 879144 | 11/1981 | U.S.S.R. . |

Primary Examiner—Samuel Scott
Assistant Examiner—Allen J. Flanigan
Attorney, Agent, or Firm—Nixon & Vanderhye

[57] ABSTRACT

The invention relates to a circulating fluidized bed reactor comprising a particle separator (9) having a horizontal vortex chamber (23). The separator is preferably disposed on top of the combustion chamber (5). The pipes (25) discharging gas from the vortex chamber have been connected to openings (24) disposed on the periphery (19) of the vortex chamber.

13 Claims, 1 Drawing Sheet

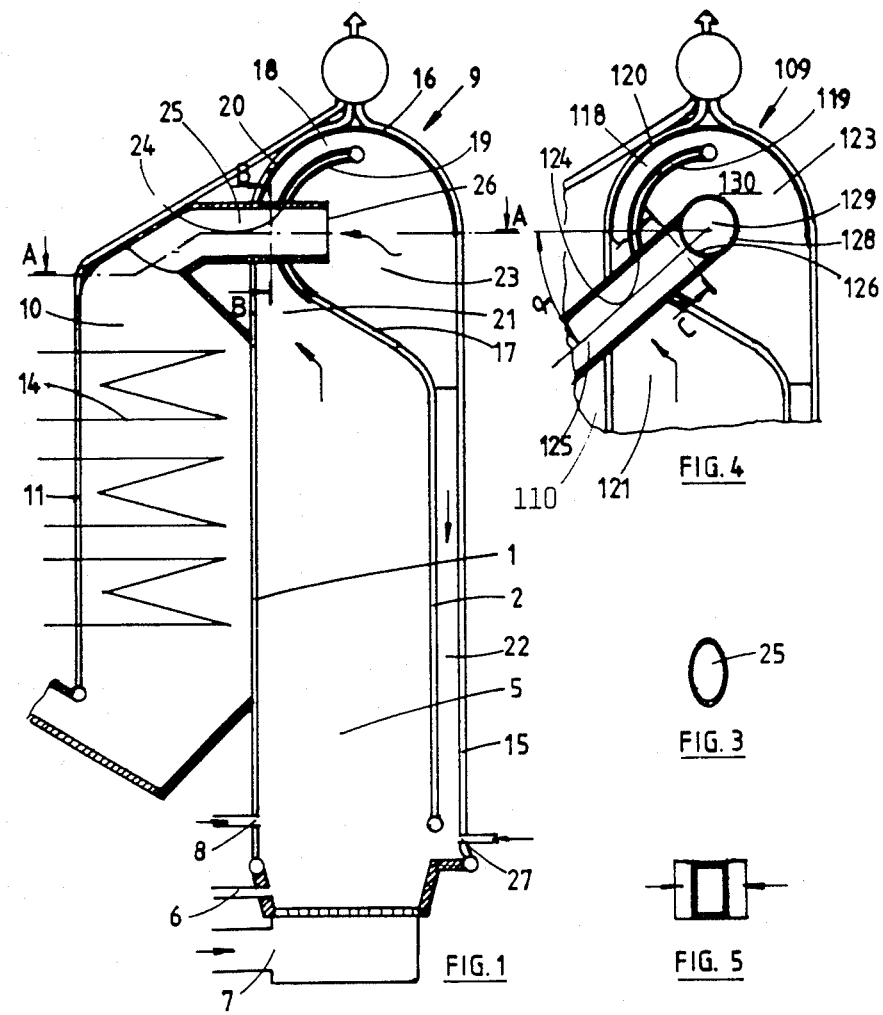
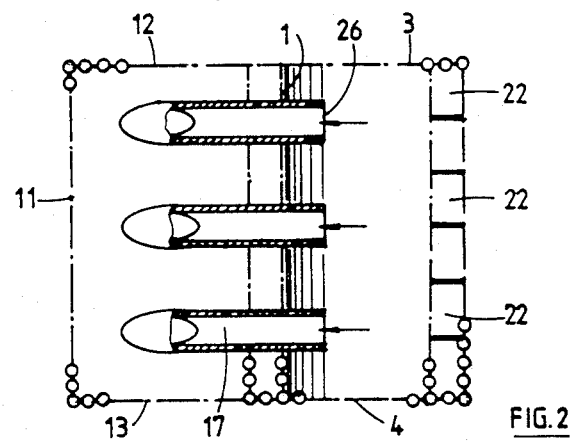

CIRCULATING FLUIDIZED BED REACTOR

TECHNICAL FIELD

The present invention relates to a circulating fluidized bed reactor comprising a vertical reactor chamber, means for separating solids from flue gases leaving the reactor chamber, the vortex chamber of which is mainly horizontal, a duct leading gases to the vortex chamber, a duct discharging purified gases from the vortex chamber and a duct connected to the vortex chamber leading solids back to the reactor.

BACKGROUND ART

The object of the invention is to accomplish a circulating fluidized bed reactor in which the gas discharge from the separator is so arranged that the reactor construction becomes simple and compact.

The circulating fluidized bed technique has long been applied e.g. in calcinators and is nowadays applied to growing extent in various reactors, such as steam boilers and gasifiers. In known applications the separation of solids from flue gases takes place in an ordinary, in its lower part funnel-shaped cyclone separator, in the cylindrical vortex chamber of which is disposed a gas outlet pipe that leads the gases upwards, and from which solids are returned to the reactor via a stand pipe.

In large circulating fluidized bed reactors several separators are usually used resulting in a complicated gas duct system, which requires several expansion joints.

As an example can be mentioned a circulating fluidized bed boiler known from the Swedish patent application No. 8203268-1 in which the back wall of the combustion chamber has been bended towards the front wall to form the ceiling of the combustion chamber. Directly under the ceiling is located a discharge opening for flue gases which is connected to the cyclone separator. The gas outlet opening of the cyclone separator is connected to a duct on top of the ceiling which duct has a connection to the vertical convection part, one wall of which is formed by the back wall of the combustion chamber. Because the cyclone separator is separated from the boiler and located on different side of the boiler than the convection part, the gas duct system becomes complicated and requires several expansion joints.

DISCLOSURE OF INVENTION

In the circulating fluidized bed boiler according to the invention the horizontal cyclone separator has been constructed so that it has been possible to eliminate the above mentioned problems. Because the separator has been intergrated with the construction of the circulating fluidized bed boiler, a both space and material saving construction is accomplished.

From the Finnish patent application No. 841126 is known an apparatus in which the separation of solids takes place in a horizontal cyclone disposed above the reactor, into the horizontal vortex chamber of which the upwards flowing flue gases of the reactor are led tangentially and in which purified gases are discharged via one or both of the end walls of the separation chamber of the cyclone.

The apparatus according to the invention is mainly characterized by that the pipe/pipes leading purified gases from the vortex chamber have been connected to opening/openings on the periphery of the vortex chamber and extend inside the vortex chamber.

The gas discharging duct/ducts are preferably disposed to pass through the gas inlet duct.

By means of the solution according to the invention a more simple construction than that of FI No. 841126 is accomplished. The duct/ducts passing the gas inlet duct join the front and back walls of the combustion chamber together and thus make the construction stronger and steadier. The gas discharging ducts can be disposed in suitable places as regards the gas purification in order to accomplish an even gas discharge in the longitudinal direction of the separator by means of a plurality of discharge ducts. Further the gas discharge from several discharge ducts to the convection part of the steam boiler can be accomplished more simply. The solution is space saving.

BRIEF DESCRIPTION OF DRAWINGS

The invention is described in more detail in the following with reference to the accompanying drawings, in which FIG. 1 shows a vertical section of one embodiment of the invention, FIG. 2 shows a section along the line A—A in FIG. 1, FIG. 3 shows a section along the line B—B in FIG. 1, FIG. 4 shows a partial vertical section of another embodiment of the invention and FIG. 5 shows a section along the line C—C in FIG. 4.

BEST MODE FOR CARRYING OUT THE INVENTION

The steam boiler shown in FIGS. 1 and 2 comprises a combustion chamber 5 defined by four walls 1–4 formed by tubes that have been welded together in a way known per se. The tubes form heat transfer surfaces of the boiler and they have been connected to the boiler circulation system in a way that has not been described in detail.

A fuel inlet 6 is located in the lower part of the combustion chamber. There are also inlets 7 and 8 for primary gas and secondary gas respectively.

A horizontal cyclone separator 9 is disposed on top of the combustion chamber. Beside the combustion chamber is situated a vertical convection part 10 which is defined by tube walls 1, 11, 12 and 13 and in which heat transfer surfaces 14 additionally have been disposed.

Two opposite walls 1 and 2 of the combustion chamber and a wall 15 parallel with the wall 2 have been used to form the particle separator. The wall 1 of the combustion chamber and the wall 15 have been bent towards each other and connected with each other to form a curved wall 16 of the separator. The wall 2 of the combustion chamber has been bent towards the wall 1 to form a ceiling 17 of the combustion chamber and runs then, first diagonally and then curving upwards, parallelly with the curved part of the wall 1 so that they form together an inner and outer wall 19, 20 of the gas inlet duct 18 of the separator, the inlet part 21 of which is convergent.

Using the back wall 2 of the combustion chamber and the parallell wall 15 two opposite walls of return ducts 22 have been formed that connect the separator to the lower part of the combustion chamber.

The upper part of the wall forming the ceiling 17 of the combustion chamber and the inner wall 19 of the gas inlet duct and the upper part of the wall 15 form the vortex chamber 23 of the separator to which the gas inlet duct 18 is tangentially connected. The return ducts 22 for solids have been connected to the lower part of the combustion chamber. In the wall 19 of the vortex chamber there are openings 24 to which pipes 25 discharging gas from the vortex chamber have been connected. The pipes 25 pass through the gas inlet duct 18 and they have been connected to the upper part of the convection part beside the combustion chamber. The pipes extend inside the vortex chamber and their openings 26 inside the vortex chamber have been directed towards the center of the vortex chamber. The pipes have been disposed in the gas inlet duct mainly perpendicularly against the flow direction of the gas from the combustion chamber and are aerodynamic in their cross-section as shown in FIG. 3 so that their flow resistance is small.

The solids containing flue gases leaving the combustion chamber are led to the vortex chamber 23 of the separator via a tangential gas inlet duct 18. Solids concentrated on the outer periphery of the vortex chamber flow to the lower part of the vortex chamber and are returned via the return ducts 22 of the combustion chamber. There is an air inlet opening 27 in the lower part of the return duct via which air can be blown to control the function of the return duct. The purified gases are discharged from the vortex chamber by means of the pipes 25 connected to the openings 24 on the periphery 19 and led to the convection part 10.

In order to prevent erosion the tube walls forming the separator and the pipes 25 are lined with a fire and erosion resistant coating, e.g. mortar.

In the embodiment of the invention shown in FIG. 4, in which only the upper part is shown since all other parts are similar to the FIGS. 1-2, the pipes 125 discharging gas from the vortex chamber 123 to the convetion part 110 have been disposed to pass through the convergent inlet part 121 of the gas inlet duct 118 between the walls 119 and 120. The pipes that have been connected to the openings 124 disposed on the periphery 119 of the vortex chamber form an angle α with the horizontal direction. Since the pipes are disposed in that part of the gas inlet duct where the cross-sectional surface is relatively large and where the flow speed due to that is low and which part is disposed at a long distance from the part where the solids containing gas flows into the vortex chamber, its effect on the flow condition of the vortex chamber is small.

The pipes 125 are square in cross-section. At the vortex chamber end of each pipe 125 there is a pipe piece 128 having an opening 126 at the pipe end. Openings 129 at the ends of the pipe 128 have been directed towards the end walls 130 of the vortex chamber. The angle α is suitably 10°-60° and preferably ca. 45°.

INDUSTRIAL APPLICABILITY

The invention is not limited to the above embodiments but it can be modified and applied within the inventive concept defined by the claims. The invention can thus be applied in e.g. reactors where the combustion chamber is not cooled.

We claim:
1. A circulating fluidized bed reactor comprising:
a vertical reactor chamber having upper and lower ends with a combustion chamber adjacent its lower end;
means adjacent said upper end for separating solids from flue gases leaving said combustion chamber including a generally horizontal vortex chamber disposed about a generally horizontal axis so that the solids and flue gases circulate about said horizontal axis and defined in part by a peripheral wall;
a first duct for flowing flue gases to said vortex chamber;
a second duct for discharging clean gases from said vortex chamber, said peripheral wall having an opening therethrough and said second duct extending through said first duct and said peripheral wall opening and opening inside said vortex chamber; and
a third duct connected to said vortex chamber and said combustion chamber for flowing solids back to said combustion chamber.
2. A circulating fluidized bed reactor according to claim 1 wherein said first duct has a convergent inlet portion, said second duct being disposed to pass through said convergent inlet portion of said duct.
3. A circulating fluidized bed reactor according to claim 1 wherein said second duct forms an angle of 15°-60° with the horizontal direction.
4. A circulating fluidized bed reactor according to claim 1 wherein said opening in said second duct is directed toward the center of the vortex chamber.
5. A circulating fluidized bed reactor according to claim 1 wherein said vortex chamber has end walls, wherein said second duct has an opening within said vortex chamber directed toward said end walls of said vortex chamber.
6. A circulating fluidized bed reactor according to claim 1 wherein said second duct is disposed generally perpendicular to the direction of flow of gases through said first duct.
7. A circulating fluidized bed reactor according to claim 1 wherein said second duct is aerodynamically shaped in cross-section at least in the part thereof in said first duct.
8. A circulating fluidized bed reactor according to claim 1 wherein said peripheral wall is arcuate about said horizontal axis with said second duct extending through said arcuate peripheral wall into central portions of the interior of said vortex chamber.
9. A circulating fluidized bed reactor according to claim 1 wherein said vertical reactor chamber has front and back walls extending generally parallel to the horizontal axis of said vortex chamber, at least one of said walls extending toward the opposite wall to form in part a ceiling for said combustion chamber and between said walls a portion of said first duct for flowing flue gases to said vortex chamber, said second duct disposed to pass through said first duct and said walls to structurally join said walls one to the other.
10. A circulating fluidized bed reactor according to claim 9 wherein said walls define a convergent inlet portion for said first duct, said second duct disposed to pass through said convergent inlet portion of said first duct.
11. A circulating fluidized bed reactor according to claim 9 wherein said second duct is disposed generally perpendicular to the direction of flow of gases through said first duct.
12. A circulating fluidized bed reactor according to claim 9 wherein said second duct is aerodynamically shaped in cross-section at least in the part thereof in said first duct.
13. A circulating fluidized bed reactor according to claim 9 wherein peripheral wall is arcuate about said horizontal axis with said second duct extending through said arcuate peripheral wall into central portions of the interior of said vortex chamber.

* * * * *